(12) United States Patent
Ohhira et al.

(10) Patent No.: US 7,849,838 B2
(45) Date of Patent: Dec. 14, 2010

(54) CANISTER STRUCTURE

(75) Inventors: Takahide Ohhira, Higashihiroshima (JP); Iwao Takaoka, Higashihiroshima (JP); Hiroshi Yokokura, Hiroshima (JP)

(73) Assignee: Mazda Motor Corporation (JP)

( * ) Notice: Subject to any disclaimer, the term of this patent is extended or adjusted under 35 U.S.C. 154(b) by 57 days.

(21) Appl. No.: 12/330,880

(22) Filed: Dec. 9, 2008

(65) Prior Publication Data

US 2009/0159055 A1 Jun. 25, 2009

(30) Foreign Application Priority Data

Dec. 25, 2007 (JP) ............... 2007-331616

(51) Int. Cl.
*F02M 33/04* (2006.01)
*F02M 33/02* (2006.01)
(52) U.S. Cl. ..................................... 123/519
(58) Field of Classification Search ............... 123/519, 123/520, 516, 518, 198 D; 137/587, 588
See application file for complete search history.

(56) References Cited

U.S. PATENT DOCUMENTS

| | | | |
|---|---|---|---|
| 4,505,248 A * | 3/1985 | Yuzawa et al. ............... 123/519 |
| 5,427,076 A * | 6/1995 | Kobayashi et al. ........... 123/520 |
| 5,727,530 A | 3/1998 | Honda et al. |
| 5,803,054 A | 9/1998 | Yamazaki et al. |
| 5,850,819 A * | 12/1998 | Kunimitsu et al. ........... 123/520 |
| 5,855,198 A | 1/1999 | Nakajima et al. |
| 5,957,113 A | 9/1999 | Masaki et al. |
| 2003/0089345 A1* | 5/2003 | Itou et al. .................... 123/520 |
| 2007/0215123 A1 | 9/2007 | Ito et al. |

FOREIGN PATENT DOCUMENTS

| | | |
|---|---|---|
| JP | 4-129868 | 11/1992 |
| JP | 63-162329 | 7/1998 |
| JP | 2001-152972 | 6/2001 |
| JP | 2004-346801 | 12/2004 |

OTHER PUBLICATIONS

European Search Report issued on Mar. 27, 2009; Application No./Patent No. 08019849.2-2311; Reference M5145EU-ds.

* cited by examiner

*Primary Examiner*—Mahmoud Gimie
(74) *Attorney, Agent, or Firm*—Studebaker & Brackett PC; Donald R. Studebaker (57) ABSTRACT

A branch pipe is coupled to a middle portion of an outside-air connection pipe. A fresh-air inlet of the branch pipe opens into the outside air. A check valve is provided in the branch pipe. The check valve restrains air in the outside-air connection pipe from flowing out into the outside air via the branch pipe and allows the outside air to flow into the outside-air connection pipe via the branch pipe when an inside pressure of the outside-air connection pipe decreases to a specified negative pressure. The fresh-air inlet of the branch pipe is positioned at a specified level higher than a fresh-air inlet of the outside-air connection pipe and disposed in a space formed between wheel house panels and a mud guard.

5 Claims, 4 Drawing Sheets

CANISTER STRUCTURE

BACKGROUND OF THE INVENTION

The present invention relates to a canister structure which comprises a canister body operative to trap fuel vapor evaporating in a fuel tank and supply the trapped fuel vapor to an intake system of an internal combustion engine of a vehicle and an outside-air connection pipe coupled to the canister body so as to open into an outside air at a fresh-air inlet thereof, the outside-air connection pipe interconnecting the inside of the canister body and the outside air.

In general, the canister comprises the canister body which accommodates a fuel-vapor trap, such as active carbon, and traps the fuel vapor which evaporates in the fuel tank with the fuel-vapor trap. Herein, the air excluding the fuel vapor is released into the outside air (atmosphere) via the outside-air connection pipe which is coupled to the canister body. In some case, the outside air may come into the fuel tank via the outside-air connection pipe and the canister body in accordance with the pressure change due to the temperature change of the inside the fuel tank.

Further, the canister body supplies the trapped fuel vapor to the intake system of the engine in accordance with the engine operation condition. Namely, the canister body is coupled to the engine intake system (intake pipe) via a purge pipe, a purge control valve operative to open or close in accordance with the engine operation condition is provided in the purge pipe. When the purge control valve opens, the inside pressure of the canister body and the outside-air connection pipe becomes a negative pressure, so that the outside air comes into the outside-air connection pipe via the fresh-air inlet of the outside-air connection pipe. Accordingly, the mixture of the outside air and the fuel vapor is supplied to the engine intake system.

Herein, there is a concern that if the water comes into the outside-air connection pipe via the fresh-air inlet, the capacity of the fuel-vapor trap would deteriorate due to the water reaching the canister body and the water would further reach the engine improperly. Therefore, it may be necessary to prevent the water from coming into the canister body properly.

Herein, Japanese Utility Model Laid-Open Publication No. 4-129868 discloses a canister structure in which the outside-air connection pipe is coupled to one end of an engine mount member with a hollow portion which comprises a horizontal center portion and both end portions which extend obliquely upward from the horizontal center portion respectively, thereby preventing the water from coming into the canister body even if the horizontal center portion is covered with water.

The canister structure of the above-described publication, however, may function properly only in a particular case in which the water level when the horizontal center portion is covered with water is considerably low. This structure could not cope with a situation in which the water level is rather higher (for example, at the level of two third of the height of a vehicle wheel).

Other Japanese Patent Laid-Open Publication Nos. 63-162329, 2001-152972 and 2004-346801 also disclose different canister structures respectively. However, these canister structures would not be sufficient yet in terms of surely preventing the water from coming in.

SUMMARY OF THE INVENTION

An object of the present invention is to provide a canister structure which can preventing the water from coming into the canister body surely even if the water level becomes rather high when the vehicle lower portion is covered with water.

According to the present invention, there is provided a canister structure, comprising a canister body coupled to a fuel tank and an intake system of an internal combustion engine of a vehicle via respective pipes, the canister body being operative to trap fuel vapor which evaporates in the fuel tank and supply the trapped fuel vapor to the intake system of the internal combustion engine, an outside-air connection pipe coupled to the canister body so as to open into an outside air at a fresh-air inlet thereof, the outside-air connection pipe interconnecting the inside of the canister body and the outside air, a branch pipe coupled to a middle portion of the outside-air connection pipe, a fresh-air inlet of the branch pipe opening into the outside air, and a check valve provided in the branch pipe, the check valve being operative to restrain air in the outside-air connection pipe from flowing out into the outside air via the branch pipe and allow the outside air to flow into the outside-air connection pipe via the branch pipe when an inside pressure of the outside-air connection pipe decreases to a specified negative pressure, wherein the fresh-air inlet of the branch pipe is positioned at a specified level which is higher than the fresh-air inlet of the outside-air connection pipe and disposed in a space which is formed between a vehicle body member to constitute a wheel house of the vehicle and a mud guard to cover the vehicle body member from a side of a vehicle wheel.

According to the above-described present invention, since the air inside the outside-air connection pipe is restrained from flowing out via the fresh-air inlet of the branch pipe by the check valve, the fuel vapor may be released into the outside air via the fresh-air inlet of the outside-air connection pipe, not via the fresh-air inlet of the branch pipe. As a result, by positioning the fresh-air inlet of the outside-air connection pipe at a specified level which is as lower as possible, it can be properly prevented that passengers have uncomfortable feelings caused by the bad smell of the fuel vapor from the fresh-air inlet of the outside-air connection pipe. Meanwhile, this lower level positioning of the fresh-air inlet of the outside-air connection pipe may easily cause a situation in which the fresh-air inlet is covered with water. However, if it is configured such that the water would not reach the connection portion to the branch pipe even if the water came into part of the outside-air connection pipe via the fresh-air inlet of the outside-air connection pipe, the inside pressure of the outside-air connection pipe would become the specified negative pressure because the outside air could not be sucked via the fresh-air inlet of the outside-air connection pipe when the purge control valve opens. Thereby, the outside air is supplied into the outside-air connection pipe via the branch pipe with the opening of the purge control valve. Accordingly, it can be properly prevented that the water coming into the part of the outside-air connection pipe is sucked into the canister body. Further, since the fresh-air inlet of the branch pipe is positioned at the specified level which is higher than the fresh-air inlet of the outside-air connection pipe, it can be properly prevented that the water comes into the branch pipe via the fresh-air inlet of the branch pipe, by positioning the fresh-air inlet of the branch pipe at a specified level which is higher than the water level. Accordingly, even if the water level is considerably high when the vehicle lower portion is covered with water, the water can be prevented from coming into the canister body properly. Herein, when the fresh-air inlet of the outside-air connection pipe is not covered with water, the inside pressure of the outside-air connection pipe does not become the specified negative pressure even if the purge control valve. Accordingly, the specified negative pressure may be properly adjusted so that the outside air can be sucked into the canister body via the fresh-air inlet of the outside-air connection pipe. Further, since the fresh-air inlet of the branch pipe is disposed in the space which is formed between the vehicle body member to constitute the wheel house of the vehicle and the mud guard to cover the vehicle body member from the side of the vehicle wheel, even if the level of two third of the height of the vehicle wheel is covered with water, the fresh-air inlet of the branch pipe can be positioned at the rather high level which is higher than the water level. As a result, it can be surely prevented that the water comes into the outside-air connection pipe via the fresh-air inlet of the branch pipe. Also, it can be properly prevented by the mug guard that the mud or the like attach to the fresh-air inlet of the branch pipe or splashes of water from vehicle wheels come into the branch pipe via its fresh-air inlet.

According to an embodiment of the present invention, the canister body is disposed below a vehicle floor, the middle portion of the outside-air connection pipe comprises a projection portion which is configured to extend upward and then downward in the space, an upper portion of the projection portion is positioned at an upper portion in the space and at a specified level which is higher than the fresh-air inlet of the outside-air connection pipe and a canister-body-side end of the outside-air connection pipe, and the branch pipe is coupled to the upper portion of the projection portion of the outside-air connection pipe. Thereby, a large-volume canister body to accommodate lots of fuel-vapor trap can be easily disposed at the vehicle, thereby properly trapping the fuel vapor without releasing it into the outside air. Further, even in a case in which the canister body (an end of the outside-air connection pipe on the side of the canister body) and the fresh-air inlet of the outside-air connection pipe are positioned at the low level, the projection portion of the outside-air connection pipe can properly prevent the water coming into the outside-air connection pipe via its fresh-air inlet from reaching the canister body. Also, the fresh-air inlet of the branch pipe can be disposed easily at the higher level than the fresh-air inlet of the outside-air connection pipe, and the water coming into the outside-air connection pipe via its fresh-air inlet can be easily prevented from reaching the connecting portion to the branch pipe, by positioning the connecting portion to the branch pipe at the higher level.

According to another embodiment of the present invention, a filter operative to prevent a foreign substance in the outside air from coming into the canister body is provided at a specified portion of the outside-air connection pipe which is located on a side of the canister body from a connecting portion to the branch pipe, the filter being positioned at a specified level which is higher than the fresh-air inlet of the branch pipe. Thereby, even if the splashes of water from vehicle wheels come into the branch pipe via its fresh-air inlet, it can be prevented that the water reaches the filter, thereby preventing any damage of the filter caused by the water.

According to another embodiment of the present invention, a T-shape pipe is provided at the middle portion of the outside-air connection pipe, the branch pipe is configured of a branch pipe portion of the T-shaped pipe, and the check valve is installed in the branch pipe portion of the T-shaped pipe. Thereby, the branch pipe can be coupled to the outside-air connection pipe easily. Further, the branch pipe can be properly formed without any pipe coupled to the tip end of the branch pipe of the T-shaped pipe, so that the branch pipe can be made compact.

According to another aspect of the present invention, there is provided a canister structure, comprising a canister body coupled to a fuel tank and an intake system of an internal combustion engine of a vehicle via respective pipes, the canister body being operative to trap fuel vapor which evaporates in the fuel tank and supply the trapped fuel vapor to the intake system of the internal combustion engine, an outside-air connection pipe coupled to the canister body so as to open into an outside air at a fresh-air inlet thereof, the outside-air connection pipe interconnecting the inside of the canister body and the outside air, a branch pipe coupled to a middle portion of the outside-air connection pipe, a fresh-air inlet of the branch pipe opening into the outside air, and a check valve provided in the branch pipe, the check valve being operative to restrain air in the outside-air connection pipe from flowing out into the outside air via the branch pipe and allow the outside air to flow into the outside-air connection pipe via the branch pipe when an inside pressure of the outside-air connection pipe decreases to a specified negative pressure, wherein the fresh-air inlet of the branch pipe is positioned at a specified level which is higher than the fresh-air inlet of the outside-air connection pipe, the middle portion of the outside-air connection pipe comprises a projection portion which is configured to extend upward and then downward in the space, an upper portion of the projection portion is positioned at an upper portion in the space and at a specified level which is higher than the fresh-air inlet of the outside-air connection pipe and a canister-body-side end of the outside-air connection pipe, and the branch pipe is coupled to the upper portion of the projection portion of the outside-air connection pipe. Thereby, the fresh-air inlet of the branch pipe can be disposed easily at the higher level than the fresh-air inlet of the outside-air connection pipe, and the connecting portion of the outside-air connection pipe to the branch pipe can be disposed easily at the higher than the fresh-air inlet of the outside-air connection pipe. Accordingly, even if the water level is rather high when the vehicle lower portion is covered with water, it can be surely prevented that the water comes into the canister body.

Other features, aspects, and advantages of the present invention will become apparent from the following description which refers to the accompanying drawings.

DETAILED DESCRIPTION OF THE INVENTION

Hereinafter, a preferred embodiment of the present invention will be described referring to the accompany drawings.

Figure 1:
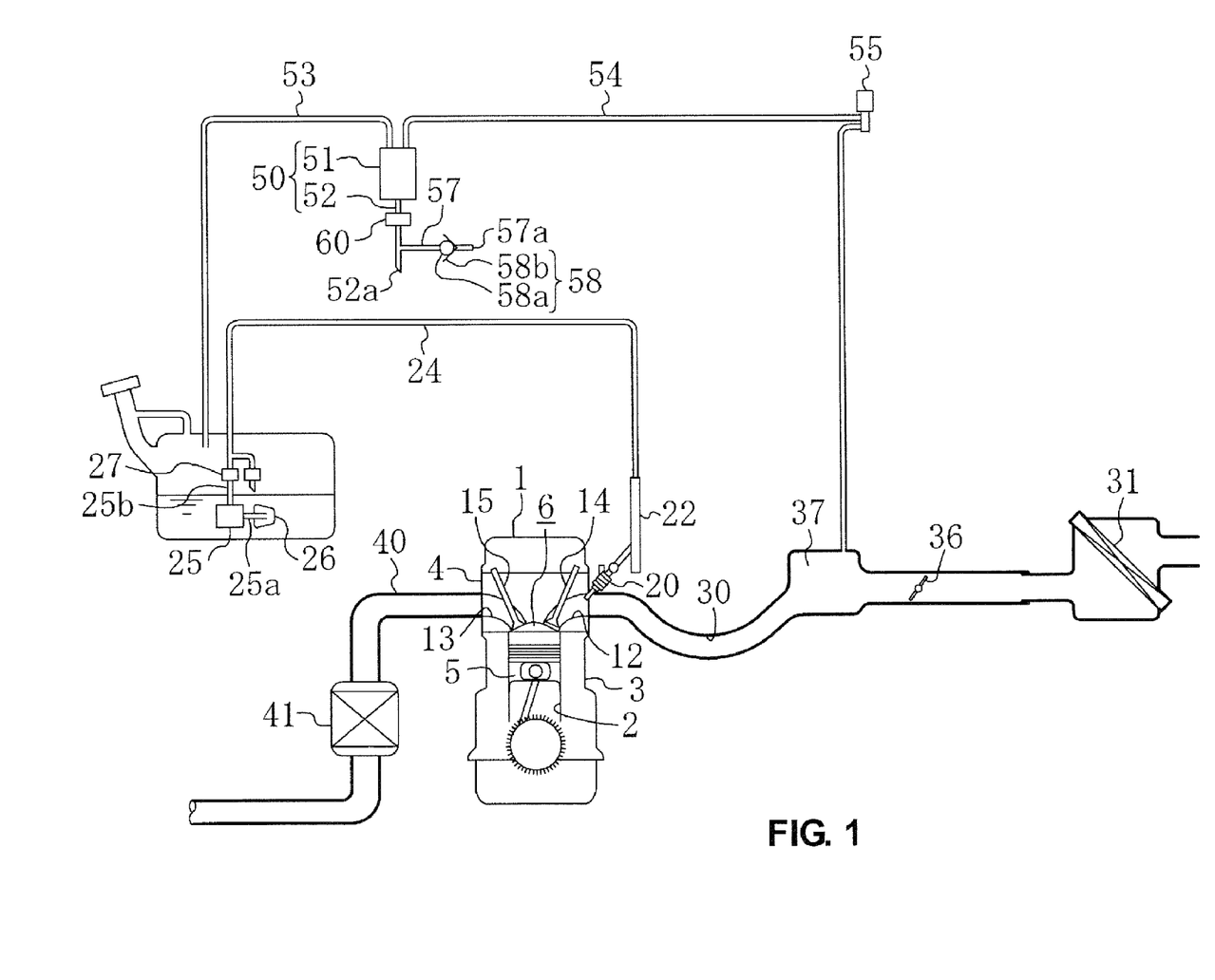
FIG. 1 is a schematic diagram showing an entire structure of a fuel-vapor purge system which comprises a canister structure according to an embodiment of the present invention.

FIG. 1 shows an entire structure of a fuel-vapor purge system which comprises a canister 50 according to an embodiment of the present invention. Reference character 1 denotes an engine as an internal combustion engine of a vehicle C (see FIG. 3), which comprises a cylinder block 3 with plural inline cylinders 2 (only one of them are illustrated) and a cylinder head 4 which is disposed above the cylinder block 3. A piston 5 is provided in each of the cylinders 2 so as to reciprocate in the cylinder 2. A combustion chamber 6 is formed between the top face of the piston 5 and the lower face of the cylinder head 4.

The cylinder head 4 has an intake port 12 and an exhaust port 13 for each cylinder 2. These ports 12, 13 are provided such that inside ends thereof open at a ceiling face of the combustion chamber 6 and outside ends thereof open at one side face and the other side face of the cylinder head 4 respectively. Further, at inside ends of the ports 12, 13 are respectively provided an intake valve 14 and an exhaust valve 15 so as to open or close openings at the corresponding inside ends of the ports 12, 13.

Further, an injector 20 is disposed at the intake port 12 of each cylinder 2 so that an injection port of the injector 20 opens into an area near an outside opening portion of the intake port 12. The injector 20 is coupled to a fuel distribution pipe 22 which extends in a cylinder-line direction. Fuel from a fuel tank 23 of the vehicle C is distributed to each injector 20 via the fuel distribution pipe 22.

The fuel distribution pipe 22 is coupled to the fuel tank 23 via a fuel supply pipe 24. A fuel pump 25 is disposed in the fuel tank 23. The fuel pump 25 comprises a suction pipe 25a with a strainer 26 which is provided at a tip of the pipe 25a and a discharge pipe 25b which is coupled to the fuel supply pipe 24 via a regulator 27. The fuel pump 25 sucks the fuel in the tank from the suction pipe 25a and discharges the sucked fuel from the discharge pipe 25b, and then supplies the fuel, the pressure of which is regulated by the regulator 27, to the fuel supply pipe 24.

An intake pipe 30 is coupled to one side face of the engine 1 so as to connect to the intake ports 12 of the cylinders 2. The intake pipe 30 supplies fresh air to each combustion chamber 6 of the cylinders 2 via an air cleaner 31. An electronic throttle valve 36 operative to adjust the throttle area of the intake pipe 30 is disposed downstream of the air cleaner 31, and a surge tank 37 is disposed downstream of the throttle valve 36. A passage downstream of the surge tank 37 is divided into plural independent passages for the plural cylinders 2, and respective downstream ends of the independent passages connect to the respective intake ports 12 of the cylinders 2.

Meanwhile, to the other side face of the engine 1 is coupled an exhaust pipe 40 operative to discharge burned gas (exhaust gas) from the combustion chambers 6 of the cylinders 2. An upstream portion of the exhaust pipe 40 is comprised of independent passages which connect to respective exhaust ports 13 and an exhaust manifold which has a single passage to which the independent passages gather. A catalyst converter 41 operative to purify the bad (harmful) composition of the exhaust gas is disposed downstream of the exhaust manifold in the exhaust pipe 40. Further, a muffler 43 operative to reduce the exhaust sound level (see FIGS. 2 and 3) is provided at the downstream end of the exhaust pipe 40.

The canister 50 comprises a canister body 51 which accommodates a fuel-vapor trap, such as active carbon, and an outside-air connection pipe 52 which is coupled to the canister body 51 so as to open into the outside air at its fresh-air inlet. The outside-air connection pipe 52 interconnects the inside of the canister body 51 and the outside air. The canister body 51 is coupled to the fuel tank 23 via a connection pipe 53 and coupled to an intake system of the engine 1 (specifically, a surge tank 37 provided at the intake pipe 30) via a purge pipe 54. Thus, the inside of the fuel tank 23 always connects to the inside of the canister body 51, and it also connects to the outside air via the fuel-vapor trap in the canister body 51 and the outside-air connection pipe 52. When a purge valve 55, which will be described later, opens, the inside of the intake pipe 30 connects to the inside of the canister body 51, and connects to the outside air via the fuel-vapor trap in the canister body 51 and the outside-air connection pipe 52. Herein, the connecting position of the purge pipe 54 to the intake pipe 30 may be located at a portion between the throttle valve 36 and the surge tank 37.

The fuel vapor (evaporating gas) which evaporates in the fuel tank 23 generally flows into the canister body 51 via the above-described connection pipe 53. The canister body 51 traps the fuel vapor with the fuel-vapor trap therein. The air excluding the fuel vapor is released into the outside air (atmosphere) via the outside-air connection pipe 52. In some case, the outside air may come into the fuel tank 23 via the outside-air connection pipe 52 and the canister body 51 in accordance with the pressure change due to the temperature change inside the fuel tank.

Further, the canister body 51 supplies the trapped fuel vapor to the intake pipe 30 (surge tank 37) via the purge pipe 54 in accordance with the operation condition of the engine 1. Namely, a purge control valve 55 operative to open or close in accordance with the engine operation condition is provided in the purge pipe 54. When the purge control valve 55 opens, the inside of the canister body 51 connects to the inside of the intake pipe 30 and thereby the inside pressure of the canister body 51 and the outside-air connection pipe 52 becomes a negative pressure, so that the outside air comes into the outside-air connection pipe 52 via a fresh-air inlet 52a of the outside-air connection pipe 52. Accordingly, the mixture of the outside air and the fuel vapor is supplied to the intake pipe 30 via the purge pipe 54. Herein, the purge control valve 55 is operative to control its opening degree, thereby adjusting the supply amount of the fuel vapor (purge mixture) to the intake pipe 30.

A branch pipe 57 is coupled to a middle portion of the outside-air connection pipe 52. A fresh-air inlet of the branch pipe 57 opens into the outside air. A check valve 58 is provided in the branch pipe 57. The check valve 58 comprises a ball valve 58a which is a valve body operative to open or close the branch pipe 57 and a valve seat 58b which the ball valve 58a contacts. The ball valve 58a is biased toward the valve seat 58b by a spring, not illustrated, in a direction from the side of the outside-air connection pipe 52 to the side of the fresh-air inlet 57a of the branch pipe 57. When the inside pressure of the outside-air connection pipe 52 becomes a specified negative pressure (the pressure difference between the inside of the outside-air connection pipe 52 and the outside air becomes a specified value), the ball valve 58a is off the valve seat 58b against a basing force of the spring and thereby the check valve 58 opens. Meanwhile, when the inside pressure of the outside-air connection pipe 52 does not become the specified negative pressure, the ball valve 58a remains contacting the valve seat 58b and thereby the ball valve 58 closes.

When the purge control valve 55 stays closed, the inside pressure of the outside-air connection pipe 52 does not become the above-described specified negative pressure. Accordingly, the check valve 58 remains closed, so that the air in the outside-air connection pipe 52 is restrained from flowing out into the outside air via the branch pipe 57. Further, even when the purge control valve 55 opens and the inside pressure of the outside-air connection pipe 52 becomes the negative pressure, the negative pressure does not reach the above-described specified negative pressure unless the fresh-air inlet 52a of the outside-air connection pipe 52 is covered with water as described later. Accordingly, the check valve 58 remains closed, so that the outside air does not come into the outside-air connection pipe 52 via the fresh-air inlet 52a of the outside-air connection pipe 52.

In the meantime, in a case in which the fresh-air inlet 52a of the outside-air connection pipe 52 is covered with water, when the purge control valve 55 is opened, the inside pressure of the outside-air connection pipe 52 becomes the specified negative pressure, without sucking the outside air from the fresh-air inlet 52a of the outside-air connection pipe 52. In this case, this negative pressure makes the ball valve 58a be off the valve seat 58b against the biasing force of the spring, so that the check valve opens. Accordingly, the outside air comes into the outside-air connection pipe 52 via the branch pipe 57, and the mixture of the outside air and the trapped fuel vapor is supplied to the intake pipe 30 via the purge pipe 54. Herein, even if the fresh-air inlet 52a of the outside-air connection pipe 52 is covered with water and the water comes into the outside-air connection pipe 52 via the fresh-air inlet 52a, since the outside-air connection pipe 52 has a projection portion 52b (see FIGS. 2-4) at its middle portion as described later, the water coming in could not reach the connecting portion to the branch pipe 57 in a case in which the purge control valve 55 is closed. Further, in a case in which the purge control valve 55 is open, the negative pressure is produced in the outside-air connection pipe 52 and this negative pressure restrains the water from coming in to the connecting portion to the branch pipe 57.

The above-described specified value (specified negative pressure) is set to a preferable one which can overcome the biasing force of the spring so as to restrain the water from coming in up to the connecting portion to the branch pipe 57. Herein, if the ball valve 58a can be seated on the valve seat 58b surely despite the relatively small basing force of the spring, the above-described specified value may be set to be smaller (smaller difference between the specified value and the outside-air pressure) so that the check valve 58 can be opened by the negative pressure which is produced in the outside-air connection pipe 52 by the opening of the purge control valve 55 when the fresh-air inlet 52a of the outside-air connection pipe 52 is not covered with water. In this case, the outside air is sucked into the canister body 51 via both the fresh-air inlets 52a, 57a of the outside-air connection pipe 52 and the branch pipe 57.

A filter 60 is provided at a specified portion of the outside-air connection pipe 52 which is located on the side of the canister body 51 from the connecting portion to the branch pipe 57. This filter 60 is operative to prevent foreign substances in the outside air from coming into the canister body 51 even if the foreign substances come in through the fresh-air inlets 52a, 57a of the outside-air connection pipe 52 and the branch pipe 57. Herein, the filter 60 may not be indispensable.

Figure 2:
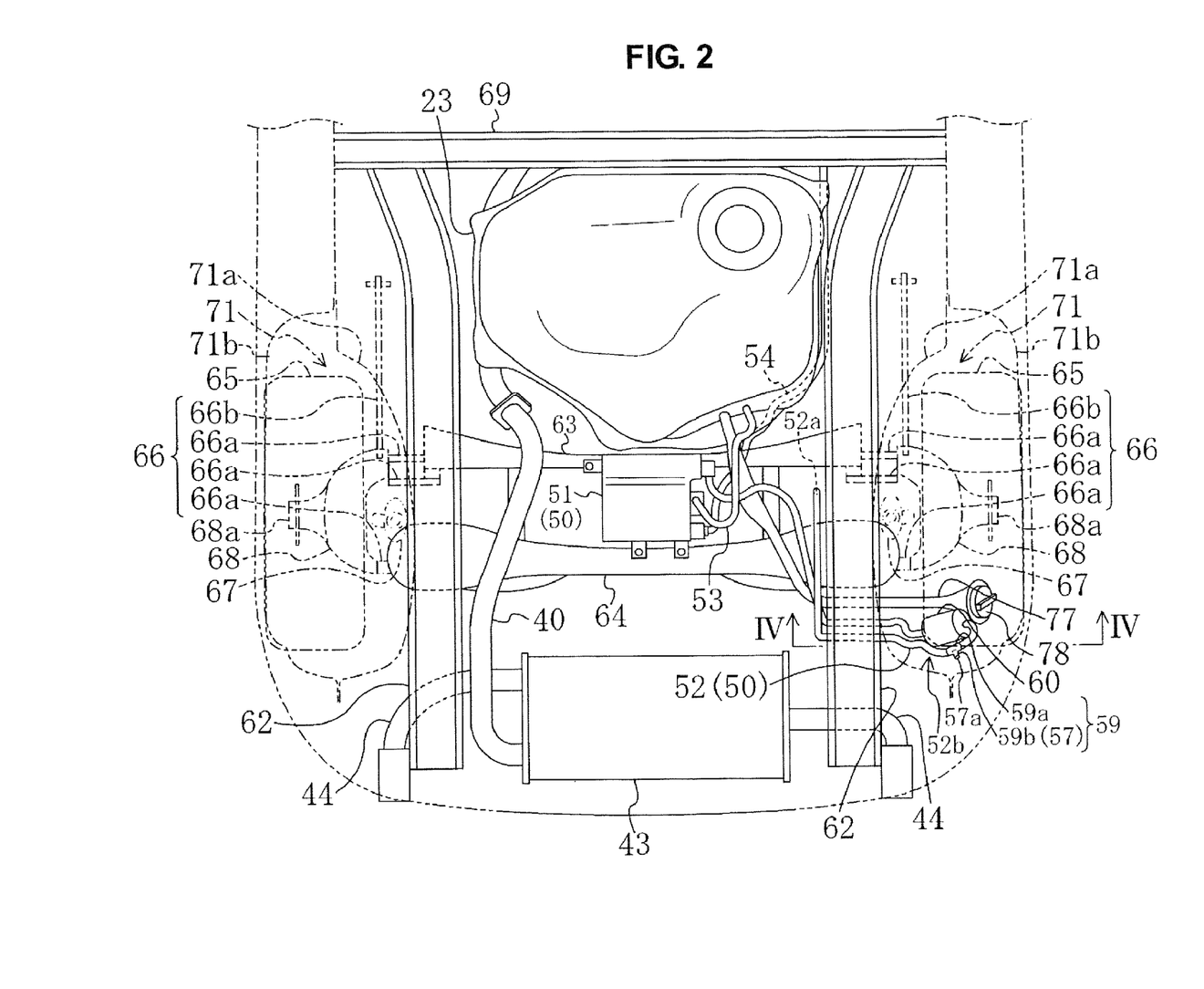
FIG. 2 is a plan view showing a vehicle rear portion below a rear floor panel.
Figure 3:
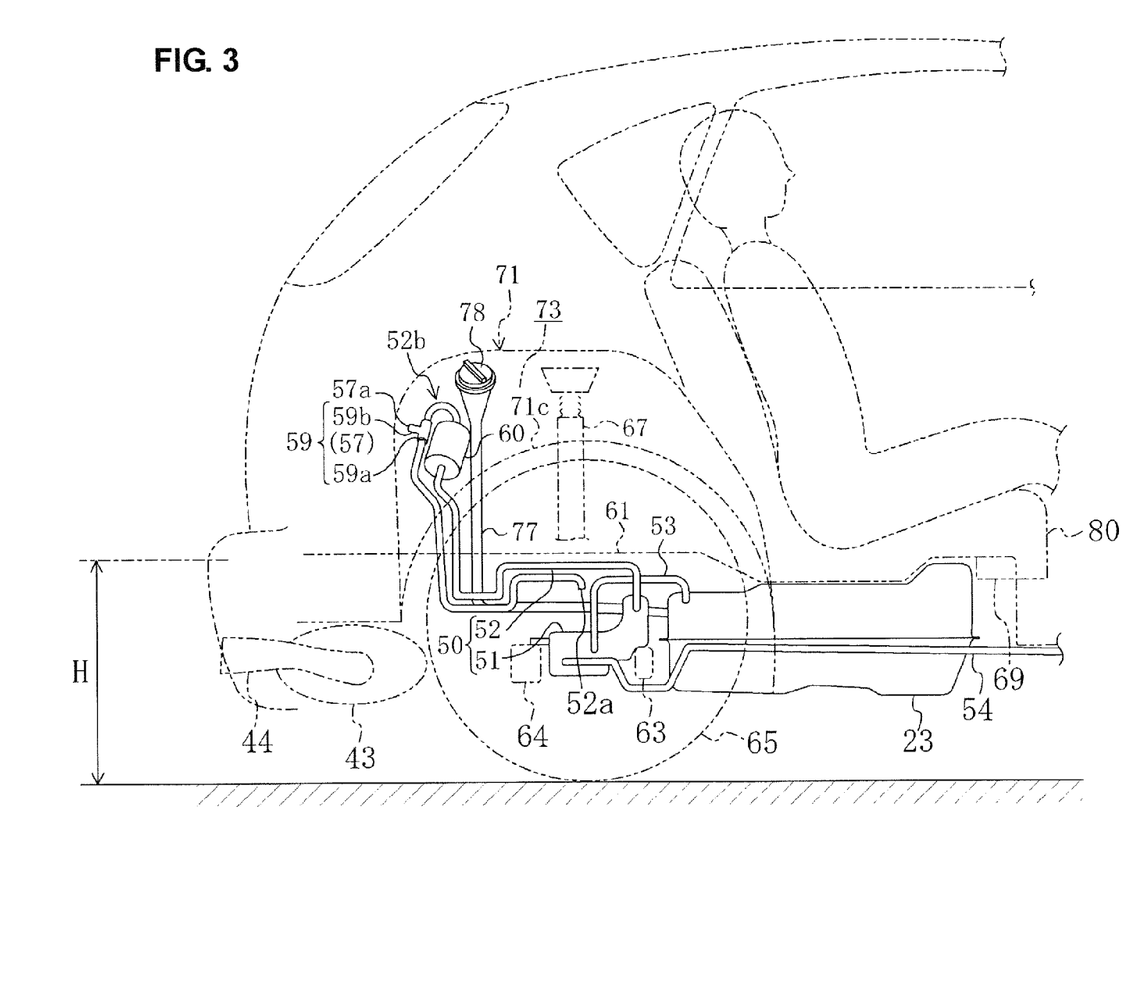
FIG. 3 is a side view showing a major portion of the vehicle rear portion, when viewed from the right side of the vehicle.

The canister body 51 of the present embodiment comprises a water-proof box-shaped container which does not allow the water to come therein even if the canister body 51 is covered with water, as shown in FIGS. 2 and 3. The canister body 51 of the present embodiment is disposed below a rear floor panel 61 (see FIGS. 3 and 4) as a vehicle floor of the vehicle C. Specifically, the canister body 51 is disposed between right and left rear side frames 62, 62 below the rear floor panel 61. Hereinafter, the words of "front" and "rear" used herein mean the front of the vehicle C and the rear of the vehicle C, respectively.

A rear-sub-frame front member 63 and a rear-sub-frame rear member 64, which are provided so as to extend in a vehicle width direction respectively and support rear suspensions 66, are attached to the rear side frames 62, 62 at respective locations which correspond to rear wheels 65. Right and left rear-wheel axles 68 are coupled to outside end portions of the above-described members 63, 64 via three lateral links 66a of the rear suspensions 66. The rear wheels 65 are fixed to respective wheel hubs 68a of the rear-wheel axles 68. Herein, reference character 66a denotes a trailing arm of the rear suspension 66 in FIG. 3, and reference character 67 denotes a shock absorber in FIGS. 2 and 3.

The canister body 51 is disposed at the central portion in the vehicle width direction between the rear-sub-frame front and rear members 63, 64. The front side of the canister body 51 is fixed to the rear-sub-frame front member 63, and the rear side of the canister body 51 is fixed to the rear-sub-frame rear member 64. The fuel tank 23 is disposed in front of the canister body 51 and between the rear-sub-frame front member 63 and a cross member 69 which is located before the rear-sub-frame front member 63. A rear seat 80 is provided on the rear floor panel 61 above the fuel tank 23. Herein, the fuel tank 23 is comprised of upper and lower split members, which are made of resin.

A filler pipe 77 to supply the fuel from the outside of the vehicle C is coupled to an upper portion of a rear end portion of the fuel tank 23. The filler pipe 77 is provided so as to extend obliquely rearward and toward one side of the vehicle (to the right side which is opposite to the exhaust pipe 40 in the present embodiment) and then below the right-side rear side frame 62 (on the right in FIG. 3), and go into a rear-wheel house 71 (see FIGS. 2 and 4).

Figure 4:
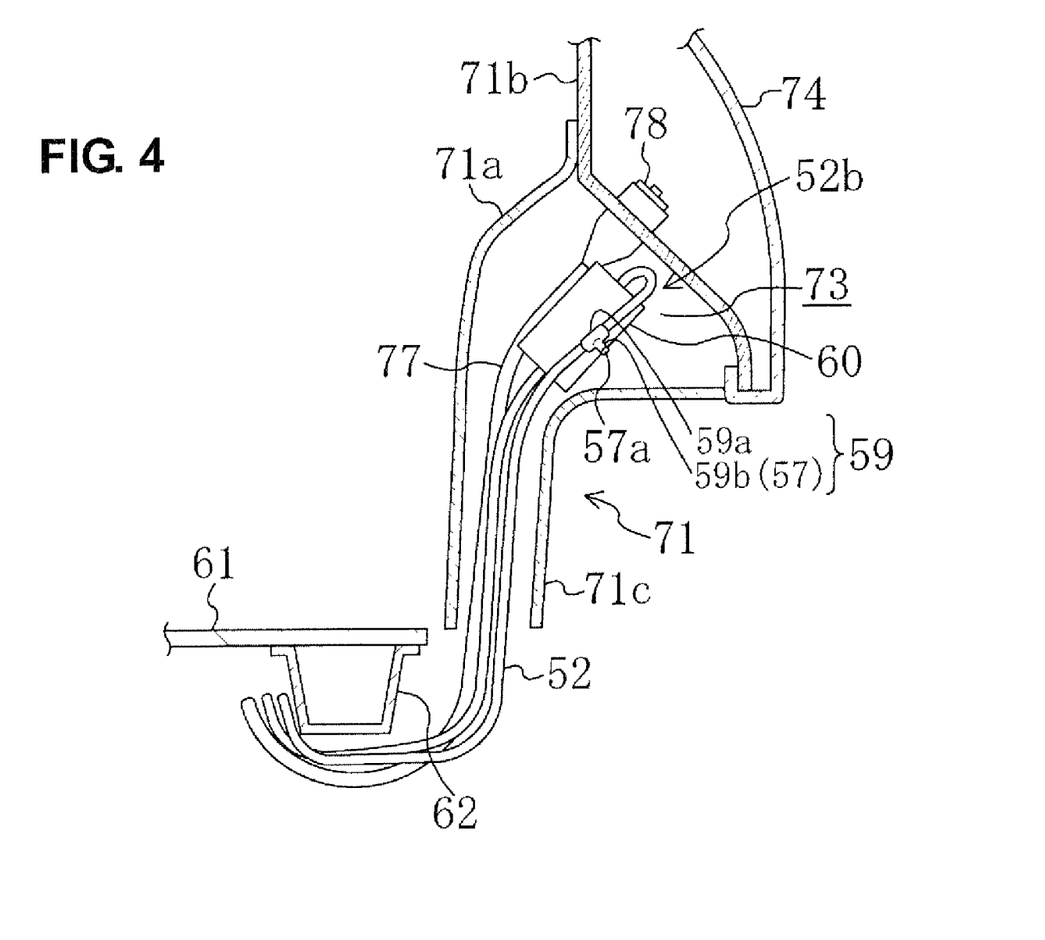
FIG. 4 is a sectional view taken along line IV-IV of FIG. 2.

The wheel house 71 is comprised of a wheel-house inner panel 71a and a wheel-house outer panel 71b as shown in FIG. 4. These panels 71a, 71b are covered with a mud guard 71c on their sides of the rear wheel 65 (a wheel-house inner peripheral side of the both panels 71a, 71b and an outside of the wheel-house inner panel 71a). A space 73 is formed between the both panels 71a, 71b and the mud guard 71c. The outside of the wheel-house outer panel 71b is covered with a vehicle outer panel 74, and lower end portions of the vehicle outer panel 74 and the wheel-house outer panel 71b are joined to each other.

The filler pipe 77 extends upward in the above-described space 73 of the wheel house 71 and then obliquely upward and outward, and penetrates the wheel-house outer panel 71b. And, a tip of the filler pipe 77 opens into the space 73 between the wheel-house outer panel 71b and the vehicle outer panel 74. A filler cap 78 is detachably provided at the tip of the filler pipe 77. A lid (not illustrated) is provided at a specified portion of the vehicle outer panel 74 which corresponds to the tip of the filler pipe 77 so as to open or close. When the fuel is supplied to the fuel tank 23, the lid is opened and the cap 78 is detached.

The exhaust pipe 40 is provided so as to extend in a vehicle longitudinal direction along and inside the left-side rear side frame 62 (the frame on the left in FIG. 3) and connect to a left-side end face of the muffler 43 which is disposed laterally. The muffler 43 is disposed below the rear floor panel 61 and in back of the rear wheel 65. Tail pipes 44, 44 are provided so as to extend from both-side end portions of the muffler 43. Each pipe 44 extends outward and then bends rearward at the outside of the rear side frames 62. Each exhaust port of tips of the pipes 44 is directed to the rear of the vehicle. A recessed tire pan for a spare tire, not illustrated, is formed at the rear floor panel 61 above the muffler 43.

The connection pipe 53 extends rearward from an upper portion of the rear end portion of the fuel tank 23, then bends downward, and connects to a central portion of the right face of the canister body 51. The purge pipe 54 extends forward from the rear end portion of the right face of the canister body 51, then forward along the right face of the fuel tank 23, and connects to the intake pipe 30 (surge tank 37) disposed in an engine room (not illustrated) at the front of the vehicle C.

The outside-air connection pipe 52 extends rearward and toward the one side of the vehicle (to the right side opposite to the exhaust pipe 40 in the present embodiment) from the upper portion of the front end portion of the right face of the canister body 51, and then extends along with the filler pipe 77 below the right-side rear side frame 62 and goes into the wheel house 71. Then, in the space 73 between the wheel-house inner and outer panels 71a, 71b and the mud guard 71c, the outside-air connection pipe 52 extends upward in back of the filler pipe 77, then obliquely upward and outward, and bends in a reverse-U shape near the wheel house outer panel 71b. Further, the outside-air connection pipe 52 extends downward along its portion extending upward, then bends rearward after passing below the right-side rear side frame 62. Finally, it extends rearward along the inside of the rear side frame 62. The fresh-air inlet 52a of the outside-air connection pipe 52 is positioned near the lower portion of the wheel house 71 (near the inside lower portion of the wheel house inner panel 71a) at the same level and the same longitudinal location as the center of the rear wheel 65. The fresh-air inlet 52a is provided so as to be directed downward. Thus, the middle portion of the outside-air connection pipe 52 comprises the projection portion 52b which is configured to extend upward and then downward in the above-described space 73. The fresh-air inlet 52a of the outside-air connection pipe 52 is located forward from the projection portion 52b. Further, the projection portion 52b is disposed in the space 73, and the upper portion of the projection portion 52b is positioned at the upper portion in the space 73 (the upper portion in the wheel house 71) and at a specified level which is higher than the fresh-air inlet 52a of the outside-air connection pipe 52 and a canister-body-side end of the outside-air connection pipe 52.

The branch pipe 57 is coupled to the upper portion of the projection portion 52b of the outside-air connection pipe 52 (which is not the highest position of the projection portion 52b, but a specified position which is near the highest position on the side of the fresh-air inlet 52a in the present embodiment). At the upper portion of the projection portion 52b (at the position near the highest position on the side of the fresh-air inlet 52a) is provided a T-shaped pipe 59 which comprises a main pipe portion 59a which extends straight and a branch pipe portion 59b which extends perpendicularly to the main pipe portion 59a from a middle portion of the main pipe portion 59a. The branch pipe portion 59b constitutes the above-described branch pipe 57, and the main pipe portion 59a constitutes the connecting portion of the outside-air connection pipe 52 to the branch pipe 57. The check valve 58 is provided at the branch pipe portion 59b. While the branch pipe 57 is only comprised of the branch pipe portion 59b in the present embodiment, another pipe may be coupled to the tip of the branch pipe portion 59b such that this pipe and the branch pipe portion 59b constitute the branch pipe 57. Coupling the branch pipe 57 to the outside-air connection pipe 52 can be facilitated by using the T-shaped pipe 59. Further, the constitution of the branch pipe 57 which is only comprised of the branch pipe portion 59b of the T-shaped pipe 59 makes the branch pipe compact and simple. Further, by disposing the T-shaped pipe 59 at the upper portion of the projection portion 52b of the outside-air connection pipe 52, the fresh-air inlet 57a of the branch pipe 57 is positioned at the higher level than the fresh-air inlet 52a of the outside-air connection pipe 52.

The filter 60 is provided at the upper portion of the projection portion 52b of the outside-air connection pipe 52 as well as the T-shaped pipe 59. In the present embodiment, the filter 60 is disposed on the opposite side to the connecting portion to the branch pipe 57 (T-shaped pipe 59) from layout space standpoints. Thus, the filter 60 is positioned at the same level as the fresh-air inlet 57a of the branch pipe 57. If possible in terms of layout space, it is preferable that the filter 60 be positioned at the higher level than the fresh-air inlet 57a of the branch pipe 57. This is because even if the splashes of water from vehicle wheels 65 come into the branch pipe 57 through the fresh-air inlet 57a, it can be restrained that the water reaches the filter 60, thereby preventing the filter 60 from receiving any damage by the water. Since the fresh-air inlet 57a of the branch pipe 57 is positioned at the high level and the rear-wheel side of the fresh-air inlet 57a is covered with the mud guard 71c in the disposition of the present embodiment, little water comes into the branch pipe 57. And, even if the water came into the branch pipe 57, it would be very difficult that the water goes over the highest position of the projection portion 52b to reach the filter 60. Thus, there may be almost no damage to filter 60 due to the water.

According to the present embodiment, the canister body 51 is disposed below the rear floor panel 61, so that the volume of the canister body 51 can be made properly large so as to accommodate a large capacity of fuel-vapor trap. Accordingly, it can be properly prevented that the fuel vapor is released into the outside air via the fresh-air inlet 52a of the outside-air connection pipe 52. Further, even if the fuel vapor was released via the fresh-air inlet 52a of the outside-air connection pipe 52, since the fresh-air inlet 52a is positioned at the relatively low level, it can be properly prevented that passengers of the vehicle C have uncomfortable feelings caused by the bad smell of the fuel vapor from the fresh-air inlet 52a of the outside-air connection pipe 52. Further, the check valve 58 is provided at the branch pipe 57 from the outside-air connection pipe 52, and it is restrained by the check valve 58 that the air in the outside-air connection pipe 52 flows out into the outside air through the fresh-air inlet 57a. Thereby, the above-described issue of bad smell may not occur even if the fresh-air inlet 57a of the branch pipe 57 is positioned at the high level.

Also, the fresh-air inlet 52a of the outside-air connection pipe 52 is located on the opposite side to the exhaust pipe 40 having a high temperature in the vehicle width direction and disposed forward from the projection portion 52b so as to be away from the muffler 43. Accordingly, even if the fuel vapor was released into the outside air via the fresh-air inlet 52a of the outside-air connection pipe 52, the fuel vapor would not be heated improperly. Herein, the fresh-air inlet 52a of the outside-air connection pipe 52 may be disposed at a forward location from the rear wheels 65 so as to be further away from the muffler 43.

Meanwhile, since the fresh-air inlet 52a of the outside-air connection pipe 52 is disposed at the low level, the fresh-air inlet 52a of the outside-air connection pipe 52 may be easily covered with water. According to the present embodiment, however, even if the lower portion of the vehicle C is covered with water at the level of the height H shown in FIG. 3 (at the level of two third of the height of the vehicle wheel 65, which is slightly lower than the specified portion of the rear floor panel 61 which corresponds to the rear wheel 65), the traveling of the vehicle can be ensured. And, even if the fresh-air inlet 52a of the outside-air connection pipe 52 is covered with water, the canister body 51 can be protected from the water coming in. Namely, even if the water comes into the part of the outside-air connection pipe 52 (the portion on the side of the fresh-air inlet 52a) via the fresh-air inlet 52a, the projection portion 52b at the middle portion of the outside-air connection pipe 52 prevents the water from reaching the connecting portion to the branch pipe 57 (T-shaped pipe 59) and the canister body 51 when the purge control valve 55 is closed. Meanwhile, when the purge control valve 55 opens, the outside air cannot be sucked through the fresh-air inlet 52a, so that the inside pressure of the outside-air connection pipe 52 becomes the specified negative pressure. Accordingly, the check valve 58 is opened, thereby allowing the outside air to come into the outside-air connection pipe 52. Herein, before part of the water coming into the outside-air connection pipe 52 is sucked up to the position of the connecting portion to the branch pipe 57 by the negative pressure, the check valve opens. As a result, the above-described part of the water may not be sucked into the canister body 51 by the above-described negative pressure. Further, since the fresh-air inlet 57a of the branch pipe 57 is positioned at the specified level which is higher than the fresh-air inlet 52a of the outside-air connection 52 and the above-described height H, it is restrained that the water comes into the outside-air connection pipe 52 via the fresh-air inlet 57a of the branch pipe 57. Thus, the water may not come into the canister body 51 and may not be sucked into the engine 1.

While the canister body 51 of the canister 50 is disposed between the rear-sub-frame front and rear members 63, 64 below the rear floor panel 61 in the present embodiment, it may be disposed at any position below the vehicle floor. Further, it may be disposed in the engine room or the wheel house (for the front wheel or the rear wheel), not below the vehicle floor. Herein, the disposition of the canister body 51 below the vehicle floor, like the present embodiment, could facilitate the disposition of the relatively large-volume canister and properly prevent the release of the fuel vapor into the outside air.

Further, the projection portion 52b of the outside-air connection pipe 52 may be disposed at any position, for example, in the wheel house for the front wheel or the engine room. Also, it may not be necessary that the projection portion 52b is provided at the middle portion of the outside-air connection pipe 52. Any other embodiments may be applied as long as the water coming in through the fresh-air inlet 52a could not reach the connecting portion to the branch pipe 57 (and the canister body 51) even if the fresh-air inlet 52a of the outside-air connection pipe 52 is covered with water. For example, in a case in which the canister body 51 is positioned at a high level in the engine room, the outside-air connection pipe 52 can be provided so as to extend downward from the canister body 51. In this case, the branch pipe 57 can be coupled to a specified portion of the outside-air connection pipe 52 which is near the canister body 51.

Further, it may be preferable that position of the fresh-air inlet 57a be positioned at a higher level. For example, the branch pipe 57 may be configured to be coupled to a specified portion of the outside-air connection pipe 52 which is located on the side of the canister body 51 from the projection portion 52b and extend upward along with the projection portion 52b to a specified level near the upper portion of the projection portion 52b in the space 73.

What is claimed is:

1. A canister structure, comprising:
    a canister body coupled to a fuel tank and an intake system of an internal combustion engine of a vehicle via respective pipes, the canister body being operative to trap fuel vapor which evaporates in the fuel tank and supply the trapped fuel vapor to the intake system of the internal combustion engine;
    an outside-air connection pipe coupled to the canister body so as to open into an outside air at a fresh-air inlet thereof, the outside-air connection pipe interconnecting the inside of the canister body and the outside air;
    a branch pipe coupled to a middle portion of said outside-air connection pipe, a fresh-air inlet of the branch pipe opening into the outside air; and
    a check valve provided in said branch pipe, the check valve being operative to completely prevent air in said outside-air connection pipe from flowing out into the outside air via the branch pipe, by completely closing a passage of the branch pipe, and allow the outside air to flow into the outside-air connection pipe via the branch pipe only when an inside pressure of the outside-air connection pipe decreases to a specified negative pressure, by opening the passage of the branch pipe,
    wherein said fresh-air inlet of the branch pipe is positioned at a specified level which is higher than said fresh-air inlet of the outside-air connection pipe and disposed in a space which is formed between a vehicle body member to constitute a wheel house of the vehicle and a mud guard to cover the vehicle body member from a side of a vehicle wheel.

2. The canister structure of claim 1, wherein said canister body is disposed below a vehicle floor, the middle portion of said outside-air connection pipe comprises a projection portion which is configured to extend upward and then downward in said space, an upper portion of the projection portion is positioned at an upper portion in said space and at a specified level which is higher than said fresh-air inlet of the outside-air connection pipe and a canister-body-side end of the outside-air connection pipe, and said branch pipe is coupled to said upper portion of the projection portion of the outside-air connection pipe.

3. The canister structure of claim 2, wherein a filter operative to prevent a foreign substance in the outside air from coming into the canister body is provided at a specified portion of the outside-air connection pipe which is located on a side of the canister body from a connecting portion to the branch pipe, the filter being positioned at a specified level which is higher than said fresh-air inlet of the branch pipe.

4. The canister structure of claim 1, wherein a T-shape pipe is provided at said middle portion of the outside-air connection pipe, said branch pipe is configured of a branch pipe portion of the T-shaped pipe, and said check valve is installed in the branch pipe portion of the T-shaped pipe.

5. A canister structure, comprising:
    a canister body coupled to a fuel tank and an intake system of an internal combustion engine of a vehicle via respective pipes, the canister body being operative to trap fuel vapor which evaporates in the fuel tank and supply the trapped fuel vapor to the intake system of the internal combustion engine;
    an outside-air connection pipe coupled to the canister body so as to open into an outside air at a fresh-air inlet thereof, the outside-air connection pipe interconnecting the inside of the canister body and the outside air;
    a branch pipe coupled to a middle portion of said outside-air connection pipe, a fresh-air inlet of the branch pipe opening into the outside air; and
    a check valve provided in said branch pipe, the check valve being operative to completely prevent air in said outside-air connection pipe from flowing out into the outside air via the branch pipe, by completely closing a passage of the branch pipe, and allow the outside air to flow into the outside-air connection pipe via the branch pipe only when an inside pressure of the outside-air connection pipe decreases to a specified negative pressure, by opening the passage of the branch pipe, wherein said fresh-air inlet of the branch pipe is positioned at a specified level which is higher than said fresh-air inlet of the outside-air connection pipe, the middle portion of said outside-air connection pipe comprises a projection portion which is configured to extend upward and then downward in said space, an upper portion of the projection portion is positioned at an upper portion in said space and at a specified level which is higher than said fresh-air inlet of the outside-air connection pipe and a canister-body-side end of the outside-air connection pipe, and said branch pipe is coupled to said upper portion of the projection portion of the outside-air connection pipe.

* * * * *